Aug. 18, 1964  P. R. TAGGART  3,145,057
VEHICLE HOPPER CLOSURE
Filed Aug. 24, 1959  3 Sheets-Sheet 1
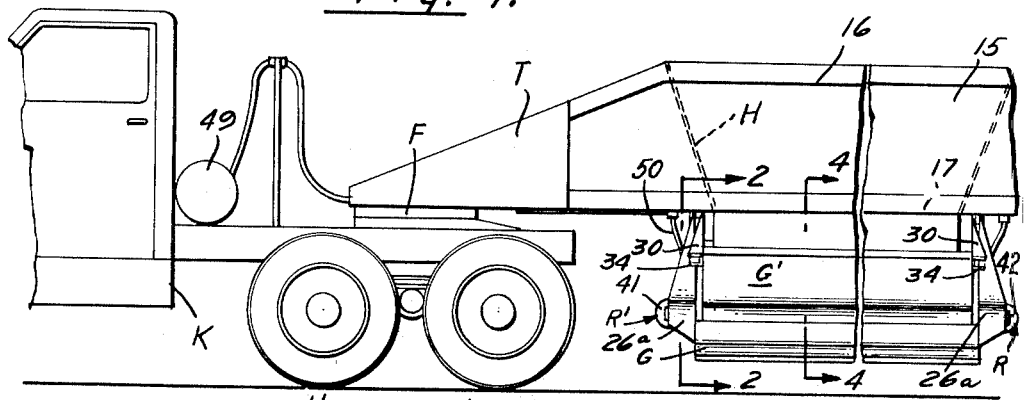
Fig. 1.
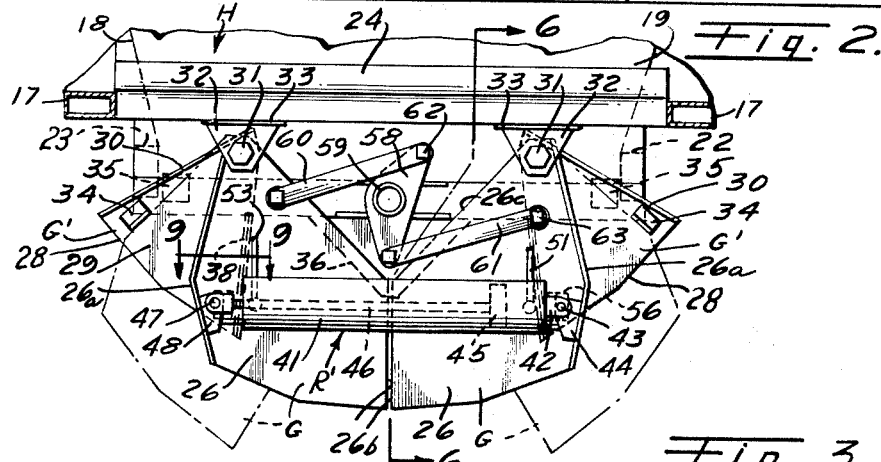
Fig. 2.
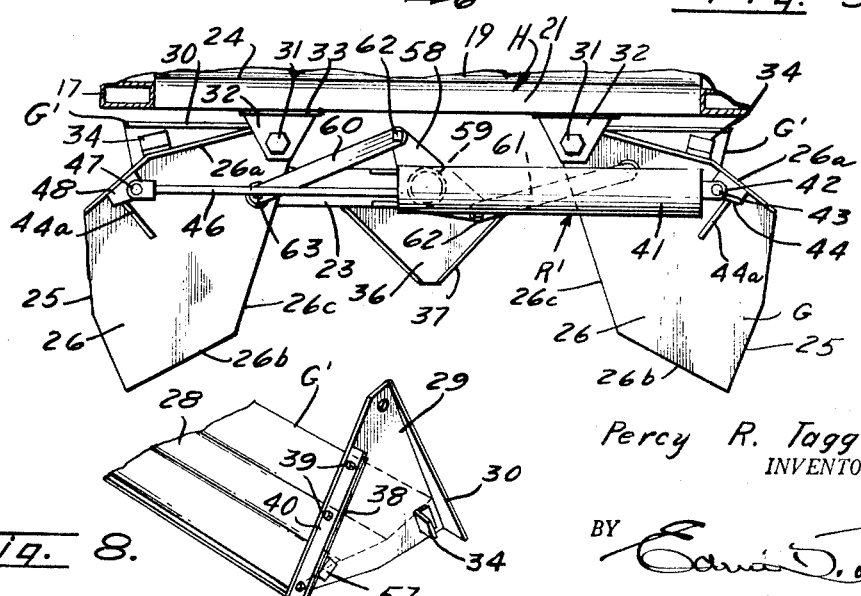
Fig. 3.
Fig. 8.
Percy R. Taggart,
INVENTOR.
BY
Attorney Aug. 18, 1964  P. R. TAGGART  3,145,057
VEHICLE HOPPER CLOSURE
Filed Aug. 24, 1959  3 Sheets-Sheet 2
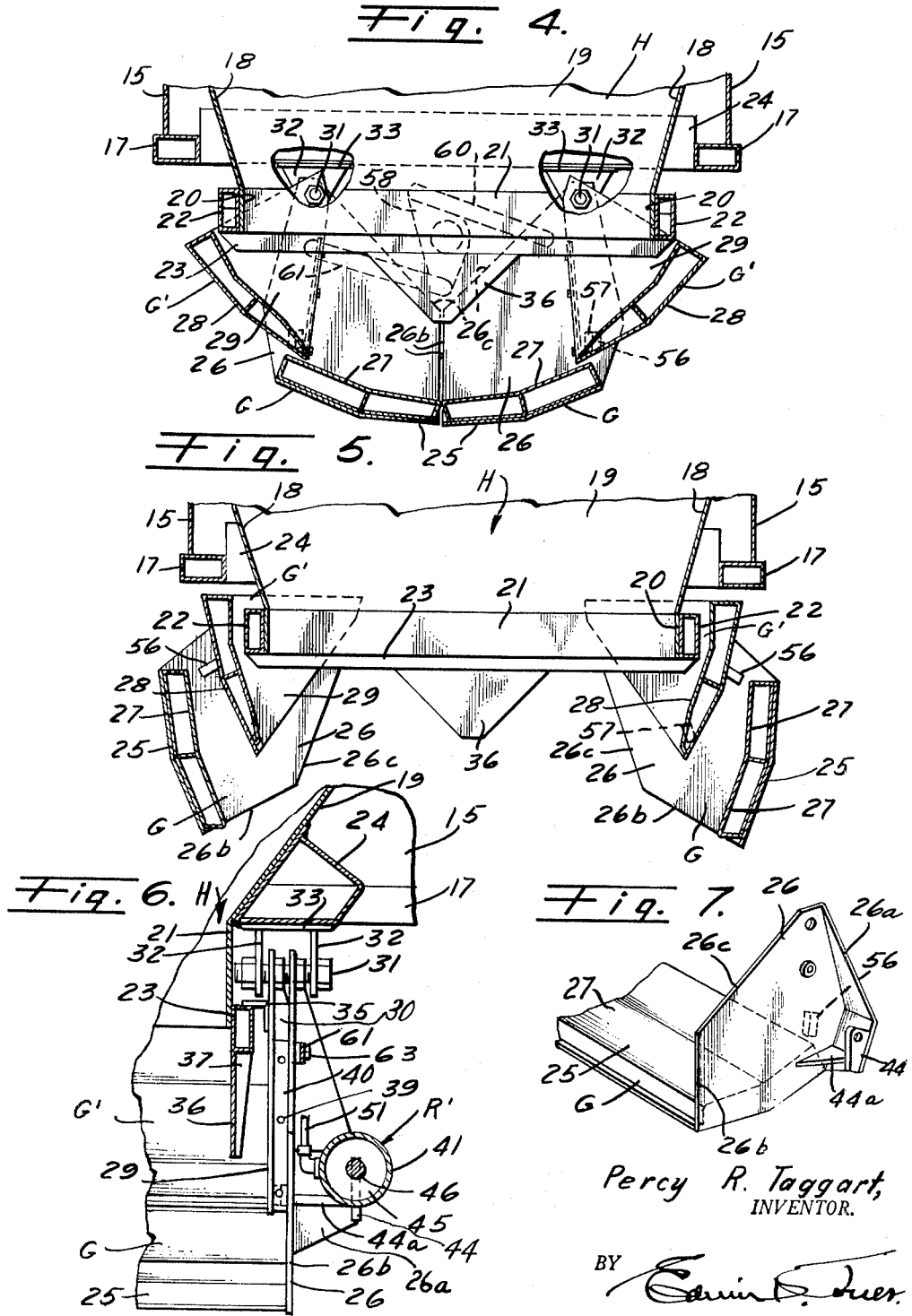
Percy R. Taggart,
INVENTOR.
BY 
Attorney Aug. 18, 1964
P. R. TAGGART
3,145,057
VEHICLE HOPPER CLOSURE
Filed Aug. 24, 1959
3 Sheets-Sheet 3
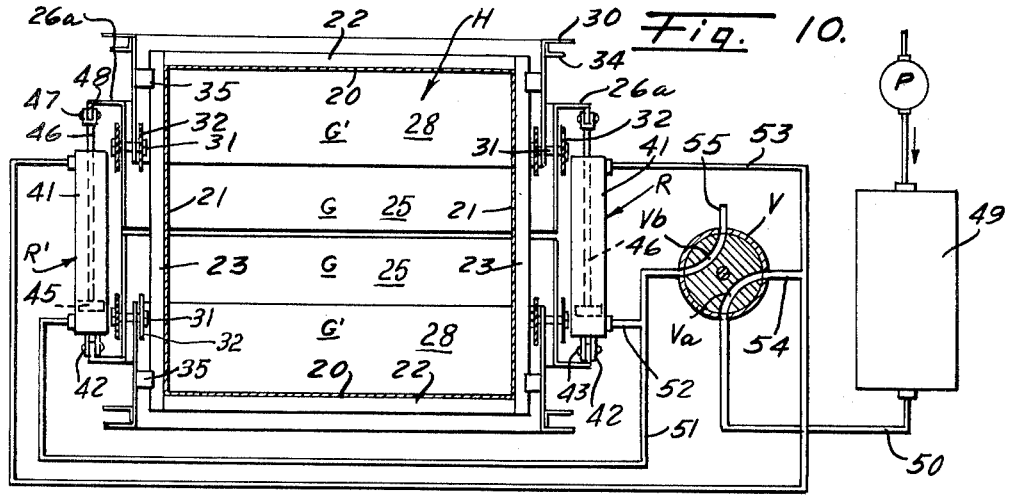
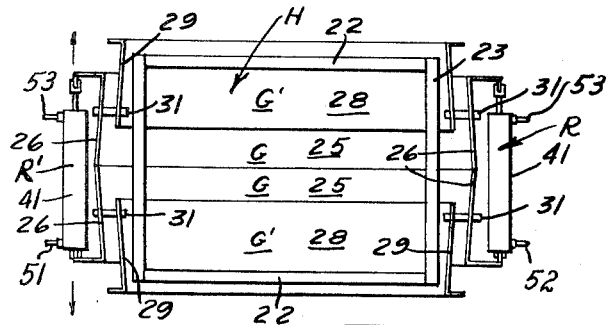
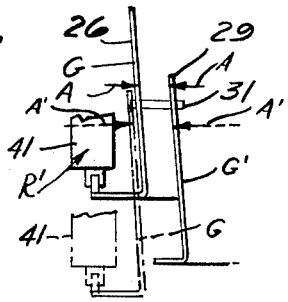
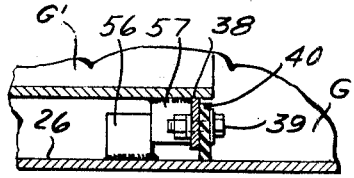
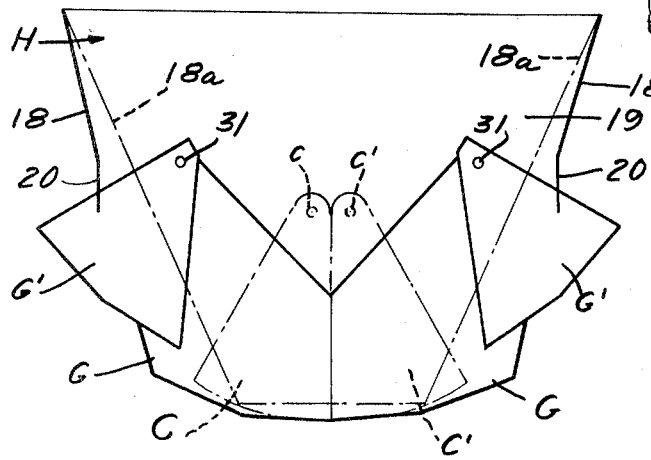
Percy R. Taggart,
INVENTOR.
BY
Attorney

United States Patent Office 3,145,057
Patented Aug. 18, 1964

3,145,057
VEHICLE HOPPER CLOSURE
Percy R. Taggart, Sylmar, Calif., assignor, by mesne assignments, to Challenge-Cook Bros. Incorporated, La Mirada, Calif., a corporation of California
Filed Aug. 24, 1959, Ser. No. 835,752
25 Claims. (Cl. 298—35)

My invention relates to hopper-type trailers, semi-trailers, and other mobile vehicles, for transporting and dumping viscous materials such as mud and wet sand, as well as dry granular materials, which are provided with open-bottom hoppers through which the materials can be dumped under the control of a closure comprising a pair of gates mounted for oppositely swinging movement to occupy open and closed positions.

When using a closure of this character the width of the bottom opening of the hopper for a given width hopper top is so limited that the sloping side walls of the hopper are inclined downwardly at an angle, such that they impede dumping of dry granular materials and particularly wet and viscous materials. Also, the combined width of the gates of the closure are correspondingly limited because of the limitation in width of the bottom hopper opening.

Due to the limitation in width both of the bottom hopper opening and the gates, it is impossible for the gates to accommodate a quantity of viscous material sufficient in weight to cause it to free itself from the material thereabove when the gates are opened and thus initiate and effect ultimately complete dumping of the sticky material from the hopper.

If the bottom hopper opening was made wider, and the gates made wider to accommodate therebetween the aforesaid quantity of viscous material, the gates could not be fully opened because they would strike the ground therebeneath or the sub-structure of the vehicle to prevent them from so doing.

It is a purpose of my invention to provide in a hopper type bottom-dump vehicle, a closure means for the hopper bottom opening that enables the use of an opening of much greater width than is possible with two gate closures and a resulting steep inclination of the side walls of the hopper so that they do not impede material dumping, and wherein the closure means is capable of accommodating and supporting the increased quantity of viscous material resulting from the increased width of the opening, and which quantity is sufficient in weight to cause it to part from the material thereabove when the closure means is opened thereby insuring the rapid and complete dumping of the viscous material from the hopper.

A further purpose of my invention is to provide mechanism for partly moving the lower gates to open positions in advance of movement of the upper gates to open positions, and all gates in their movement to open positions moving laterally away from the viscous material so as to break the bond between the material and the gates and thus to effectively release the material for gravitational discharge from the hopper.

Another purpose of my invention is to provide a hopper-bottom closure means in which the mechanism is operable to move the lower gates to both open and closed positions, that is in the form of fluid-pressure-operated means, the upper gates having means thereon engageable by the lower gates as they are moved to open position to lift the upper gates to open position. This successive movement of the gates requires less force to actuate them than if they were actuated simultaneously. This would be true also should mechanical or manual means be employed.

Still another purpose of my invention lies in the provision of a hopper-closure means that functions in conjunction with the wide hopper-bottom-opening to cause the material when dumped to spread out onto the ground in front of the rear wheels of the vehicle so that when the vehicle is advanced to progressively dump the material the rear wheels will, substantially at the beginning of the operation, roll up on the dumped material, providing such clearance between the material and the rear wheel axle as not to interfere with advancement of the vehicle for progressive dumping.

A further purpose of my invention is the provision of closure gates of this character in which the lower gates have end wall portions which are spaced apart when the gates are in closed position, and members fixed to and depending from the ends of the hopper that bridge said portions and thus completely close the ends of the lower gates to prevent the escape of material at such hopper ends. Also, sealing means is carried by the upper gates to prevent the escape of material from between the ends of the upper and lower gates.

Another purpose of my invention is the provision of a closure means having means for securing the upper gates to the lower gates when in closed position so as to prevent the upper gates from accidental movement to open position under the weight of the hopper material as imposed thereagainst, and especially when loading the hopper.

Another purpose of my invention lies in the setting of the ends of the gates at an angle such that under opening movement of the gates the distance beween the ends of the upper gates and the ends of the lower gates increases to cause them to open away from the hopper material thus eliminating binding of the gate ends to each other or tending to compress the material between the gate ends.

I will describe only two forms of closure means for hopper-type bottom-dump vehicles each embodying my invention, and will then point out the novel features thereof in claims.

In the accompanying drawings:

FIG. 1 is a fragmentary view showing in side elevation a truck and a trailer coupled thereto and having a bottom-dump hopper therein, and one form of closure means embodying my invention applied to the hopper.

FIG. 2 is an enlarged vertical sectional view taken on the line 2—2 of FIG. 1 showing the gates of the closure means in closed position.

FIG. 3 is a view similar to FIG. 2 but showing the gates of the closure means in open position.

FIG. 4 is an enlarged vertical sectional view taken on the line 4—4 of FIG. 1.

FIG. 5 is a view similar to FIG. 4 but showing the gates in open position.

FIG. 6 is an enlarged fragmentary sectional view taken on the line 6—6 of FIG. 2.

FIG. 7 is a fragmentary detailed perspective view of one of the lower gates.

FIG. 8 is a view similar to FIG. 7 of one of the upper gates.

FIG. 9 is an enlarged horizontal vertical sectional view taken on the line 9—9 of FIG. 2.

FIG. 10 is a top plan schematic view of the closure means and the fluid-pressure system by which the piston and cylinder units can be actuated to move the gates to open and closed position.

FIG. 11 is a schematic view illustrating the difference in hopper construction when using the closure gates of my invention as compared to the conventional two-gate closure.

FIG. 12 is a top plan schematic view showing a modified form of gate construction embodying my invention and wherein the gates are in closed position.

FIG. 13 is a fragmentary view similar to FIG. 12 showing the gates in open position.

Referring more particularly to the drawings, in FIG. 1 is shown a conventional form of a power-driven truck K to which is coupled, by means of a fifth wheel F, the forward end of a trailer T. The trailer T includes side walls 15, an upper frame having side members 16, and a lower frame having side members 17, preferably of box-like construction as shown in FIG. 4.

Within the confines of the trailer frames is a hopper H made up of side walls 18 and end walls 19 all of which are fixed at their upper edges to the upper trailer frame. From there the side and end walls converge downwardly to vertical side portions 20 at the lower edges of the side walls 18, and vertical portions 21 at the lower edges of the end walls 19.

Welded to and extending around the hopper portions 20 and 21 is a rectangular frame having side beams 22 and end beams 23 preferably of box-like construction. Above the end beams 23 are a pair of cross beams 24 of box-like construction which are welded to and extend across the hopper end walls 19, as best illustrated in FIG. 6.

It will be understood that the vertical portions 20 and 21 define the boundaries of the open bottom of the hopper H, and for controlling the dumping of material therefrom, such as mud and wet sand, closure means embodying my invention and constituting the bottom of the hopper, is provided. This closure means comprises a pair of complemental closures, and each closure consists of a lower gate G and an upper gate G'. The gates of the two pairs are mounted at their ends for oppositely swinging movement inwardly to occupy the closed positions shown in FIGS. 2 and 4, and outwardly to occupy the open positions shown in FIGS. 3 and 5.

Each lower gate G comprises a wall 25 corresponding substantially in length with the bottom opening of the hopper H and end walls 26 each provided along two of its edges with a flange 26a, as best illustrated in FIG. 7. The wall 25 is of generally arcuate form in cross section and has welded to the inner side thereof two members 27 of box-like construction for reinforcing the wall against possible bending under the weight of the material in the hopper imposed thereon when the gate is in closed position. Each upper gate G' comprises a transversely curved side wall 28 of box-like construction, and end walls 29 each of substantially triangular form and provided on one of its edges with a tapered flange 30, as best shown in FIG. 8.

The two gates of each closure are suspended for swinging movement to occupy open and closed positions by pins 31 in the form of bolts which are supported in ears 32 fixed to a plate 33 welded to the underside of the beams 24 (see FIG. 6). The upper ends of the walls 26 and 29 of the respective gates G and G' are pivotally mounted on the pins 31, and thus the gates are suspended for oppositely swinging movement to occupy open and closed positions, and to normally gravitate to closed positions.

The afore-described suspension means obviously allows independent swinging movements of the gates G and G' but, in my invention, mechanism is provided for moving only the lower gates G to open position which, in turn, effects movement of the upper gates to open position, through the provision of a pair of lugs 34 on the end walls 29 of the gates G' which, during lifting of the gates G to open position, are engaged by the flanges 26a to lift the upper gates G' to open position, as will be understood from a consideration of FIGS. 2 and 3.

Since the gates of each closure are normally free to gravitate to closed position and wherein the confronting edges 26b of the lower gates substantially abut each other when the gates are closed, some provision must be made for limiting downward swinging movement of the upper gates G' to closed position since the end walls 29 thereof do not abut each other. For this purpose, stops 35 in the form of angle plates are fixed to the inner sides of the end walls 29 which abut the end beams 23 when the gates are closed.

In the closed position of the gates G, it will be noted that the edge portions 26c of the walls 26 diverge from each other to leave an intervening space which, to prevent the escape of material at the ends of the gates, are spanned by triangular plates 36. These plates 36 have flanges 37 on their outer sides for reinforcing the same (see FIG. 6), and they are secured on and in depending relation to the end beams 23. Although the upper gates G' are spaced one from the other when in closed position, because they telescope partly into the lower gates G, their end walls are spanned by the end walls 26 of the gates G and the plates 36 to prevent the escape of material at the ends of the gates G'.

To prevent escape of material from between the ends of the gates when closed, seals are provided between the end walls 29 of the gates G', and the end walls 26 of the gates G. Each seal comprises a flat metal strip 38 welded at one of its longitudinal edges to the outer side of the wall 29 adjacent one edge of the latter (see FIG. 8). Secured to one side of the strip 38 by bolts 39 is a flat strip 40, of the same shape as the metal strip and which may be of any suitable flexible and durable material such as rubber or leather. The flexible strip 40 is so secured to the metal strip 38 that one of its longitudinal edges projects therefrom leaving a portion which has contact with the confronting side of the end wall 26 to span the space between the walls 26 and 29 for such portion thereof as to prevent the escape of material from between the gate ends (see FIG. 9), Any suitable mechanism may be provided for moving the lower gates G simultaneously to open and closed positions, and for retaining them in either position. This mechanism may be manually operated or power-operated and preferably the latter. In the present instance, the mechanism comprises a pair of pneumatically-operated double-acting units R and R' at opposite ends of the gates G. Each unit R or R' comprises a cylinder 41, one end of which is closed and has fixed thereto ears 42 which, by a pin 43, are pivotally connected to an ear 44 fixed on the flange 26a of one gate G and braced by a gusset 44a. Within the cylinder 41 is a piston 45 having a rod 46 extending through the other cylinder and pivoted as at 47 to an ear 48 on the other gate G.

A tank 49 connected to a power-operated pump P provides a source of air pressure for actuating the units R and R'. As shown in FIG. 10 the tank 49 is connected to a conventional rotary valve V by a conduit 50, and from the valve extends a conduit 51 which leads to one end of the cylinder 41 for the unit R'. A branch conduit 52 leads from the conduit 51 to the same end of the cylinder 41 for unit R. A conduit 53 is connected at its ends to the other ends of the cylinders 41 of the units R and R', and a branch conduit 54 connects the conduit 53 between its ends to the valve V. An exhaust conduit 55 connects the valve V to atmosphere, and the valve has two passages Va and Vb.

When the valve V is in the position shown in FIG. 10 air under pressure from the tank 49 has been supplied through the conduit 50, passage Va, conduits 54 and 53 simultaneously to the piston rod ends of the cylinders 41 to so move the pistons 45 as to force the rods 46 into the cylinders, and at the same time to move the cylinders in the direction of the rods. Thus the lower gates G are moved to closed position while the upper gates G' are free to gravitate to closed position. In this operation, air from the closed ends of the cylinders 41 is exhausted to atmosphere through the conduits 52, 51, passage Vb, and conduit 55.

For operating the units to move the gates to open position the valve V is turned 90° in either direction from the position shown in FIG. 10, whereby air from the tank 49 is supplied to the closed ends of the cylinder 41 through the conduit 50, passage Va, and conduits 51 and 52. At the same time air is exhausted to atmosphere from the other ends of the cylinders through the conduits 53 and 54, valve passage Vb, and exhaust conduit 55. Thus the piston rods 46 are moved outwardly of the cylinders 41, and the latter simultaneously moved away from the rods, thereby swinging the lower gates to open position and lifting the upper gates to open position.

When all of the gates are closed, the lower gates are held closed by proper application of air under pressure to the units R and R', but there is a tendency of the upper gates G' to open because of the weight of the hopper material as imposed thereon. To prevent this there is provided a pair of locking members 56 and 57 for each pair of gates G and G' which are in the form of metal blocks.

As shown best in FIG. 9, one block 56 is welded to the inner side of the respective gate ends 26 adjacent the flange 26a, and the block 57 welded to the confronting side of the companion gate end 29 adjacent the lower end of the strip 38. As so located the blocks 56 at the ends of the lower gates G' abut the blocks 57 at the ends of the upper gates G when all of the gates are closed.

Since the lower gates are held closed by the units R and R' the blocks 56 are secured against movement, and the blocks 57 in abutting the blocks 56 hold the upper gates against opening under the weight of the material as imposed on the bottoms thereof.

As previously described herein under movement of the gates G to open position the gates G' are lifted to open position through coaction of the lugs 34 and the flanges 26a, and thus through simultaneous opening of the gates G simultaneous opening of the gates G' is effected but in a successive order with respect to the gates G because of the location of the lugs 34. As will be seen from the partly open position of the gates G as illustrated in broken lines in FIG. 2, the gates move substantially halfway to fully open position before opening movement of the gates G' is initiated.

To insure movement in unison of the gates G to open and closed positions, means are provided on the end walls 26 of the lower gates G, each of which comprises a bell-crank lever 58 fulcrumed as at 59 on one of the end beams 23. To opposite corners of the lever 58 a pair of links 60 and 61 are pivotally connected at one of their ends as at 62, the other ends thereof being pivotally connected as at 63 to the end walls 26 of the gates G. From this construction it will be obvious that the motion of one gate G will be transmitted simultaneously to the other gate G in a manner such as to cause the two gates to move in unison in either open or closed position.

In order that the previously recited material-dumping advantages provided by my four-gate closure over the conventional two-gate closure may be fully appreciated, in FIG. 11 the hopper H is schematically illustrated in solid lines as well as the gates G and G'. In broken lines is schematically illustrated the conventional two-gate closure, the gates thereof being indicated at C and C' and mounted for oppositely swinging movement at the ends of the hopper by pivots c and c'.

Whn using the two-gate closure the side hopper walls 18a, shown in broken lines, must of necessity slope gradually downward to the open hopper bottom shown, which is relatively narrow. Naturally, the walls 18a greatly impede descent of material to the hopper-bottom opening and particularly wet material, such as mud. Also, the narrow hopper-bottom opening not only restricts discharge of the material, but what is more disadvantageous it cannot permit the material to spread laterally beneath the hopper into the path of the rear wheels of the trailer to elevate the wheels and thereby the rear axle, so that the dumped material does interfere with forward movement of the trailer by engaging the axle.

With the four-gate closure of my invention, the side hopper walls 18 can be sloped downwardly at a relatively steep angle as compared to the walls 18a, so as not to impede downward movement of the material, and particularly mud or other viscous material once the gates are opened. Additionally, the steep wall 18 provides a much wider hopper-bottom opening so that the material as dumped will spread into the path of the rear trailer wheels, and thus as the trailer is advanced the wheels will ride up on the material and thereby elevate the rear axle so that it does not interfere with forward movement of the trailer to progressively dump the material.

A further advantage provided by my closure is that two upper gates and the two lower gates suspended as they are from the hopper ends, operate, when swung outwardly to open position, to break the bond between the viscous material and the gates to insure discharge of the material from between the two pairs of gates.

In FIG. 12 is shown a modified form of closure means which is identical to the closure means of FIG. 10 with the exception that the end walls 26 and 29 of the gates G and G' instead of being at right angles to the ends of the walls 25 and 28 respectively, are flared outwardly so that they are in divergent relation one to the other as suspended from the horizontal pivots 31.

When the gates are in the closed position shown in FIG. 12 the divergent end walls 29 of the upper gates G' are spaced in parallelism to the divergent end walls 29 of the lower gates G. When the lower gates are swung to open position the upper gates remain closed until the lower gates reach the position shown in broken lines in FIG. 2. During this period of opening of the lower gates those portions of their end walls below the pivots 31 move laterally outward from the corresponding portions of the stationary end walls of the lower gates, resulting in an increase in distance between the two.

This will be apparent from FIG. 13 in which the lower gate G is shown in broken lines in partly open position and in solid lines in closed position. The arrows A indicate the distance between the walls 26 and 29 when the gates are closed, and the arrows A' indicate the increased distance between such walls when the lower gate is partly opened.

By virtue of such increase in distance or spacing of the walls 26 and 29, while small, is, nevertheless, sufficient to prevent any material, and particularly mud, that might lodge between these walls from jamming the gates against movement to completely open position.

Although I have herein shown and described only two forms of closure means, and one form of mechanism for operating the closure means, each embodying my invention, it is to be understood that various changes and modifications may be made therein without departing from the spirit of the invention and the spirit and scope of the appended claims.

What I claim is:

1. In combination with a hopper adapted to handle lading and having an elongated wide-mouthed discharge opening of sufficient capacity for the lading to be precipitously discharged upon full opening of said discharge opening, inner and outer pairs of horizontally extending closure gates for said opening having upstanding end walls and including means pivotally supporting said gates adjacent the opposite ends of said elongated discharge opening for swinging movement toward and away from a medial vertical plane through said discharge opening, said pivotal support means for supporting said inner and outer gates for independent movement and being so arranged that when all gates are in their respective closed positions gravity forces are effective on the outer pair of gates to urge them to swing toward one another and effective on the inner gates to urge them to swing away from their closed position, and means to move said gates to and to hold them selectively in open, closed and intermediate positions therebetween.

2. The combination defined in claim 1 characterized in that the center of gravity of the portions of the hopper charge supported by the respective ones of the inner pair of gates lies in a vertical plane spaced inwardly of the pivot axes of said inner gates and is effective to supplement gravity in urging said gates to open.

3. The combination defined in claim 2 characterized in that said means for opening and closing said gates includes means powered by pressurized fluid disposed across the opposite narrow ends of said discharge opening and connected directly to the end walls of said inner gates, and means selectively operable to condition said power means to move all of said gates to their respective closed positions and to hold the same closed.

4. The combination defined in claim 3 characterized in that said power means is operable to press said gates closed across a stream of material flowing downwardly out of said hopper discharge opening and terminate discharge irrespective of quantity of material present in the hopper, said power means including a pair of fluid operated cylinders connected across the ends of said inner pair of gates and having a common control for selectively supplying pressurized fluid to operate both cylinders simultaneously in a direction to open and to close said gates.

5. In combination, a hopper closure structure for a hopper having a wide-mouthed outlet, said structure comprising movably supported inner and outer pairs of overlapping closure members mutually cooperating when closed to underlie and close said hopper outlet and pivotable separately and independently away from their closed positions to open positions spaced substantially clear of said outlet, said inner pair of closure members tending to open by gravity when in closed position, pressurized fluid motor means connected between the inner pair of closure members for partially opening the lower adjacent ones of said inner pair of closure members in unison and for thereafter simultaneously opening all of said closure members, and means including said fluid motor means for holding all of said closure members positively closed after being returned to their respective closed positions.

6. A hopper having steeply sloping side walls converging downwardly to the sides of a rectangular discharge opening, inner and outer pairs of elongated gates independently pivotally supported adjacent the opposite ends of said discharge opening for upward swinging movement laterally of the longer lateral sides of said discharge opening to an open position wherein said gates lie substantially entirely outwardly of said lateral sides of said opening, the inner edges of the outer gates being positioned closely above and overlapping the outer edges of the inner gates in the fully closed positions of the gates, said inner pair of gates being supported for swinging movement about parallel axes located above and parallel to the said overlapping edges of said inner and outer gates when in closed positions whereby said inner gates tend to swing toward open position from the closed position thereof, and means for closing and for holding said inner pair of gates closed.

7. A hopper as defined in claim 6 characterized in that said outer pair of gates is supported for swinging movement about parallel axes located above the load supporting surfaces thereof and substantially closer to their inner than to their outer lateral edges considered with respect to a vertical plane passing through their respective pivot axes whereby said outer gates tend to swing toward closed position, and means for holding said inner gates closed so long as said inner gates are held closed and for releasing said outer gates for opening movement upon release of said inner gates for opening movement.

8. A hopper as defined in claim 7 characterized in that the radius of swinging movement of said outer gates is sufficiently shorter than the radius of swinging movement of said inner gates that the latter are swingable laterally past said outer gates with the load supporting surfaces thereof disposed outwardly of the adjacent lateral edge of said hopper discharge opening.

9. A hopper as defined in claim 6 characterized in the provision of means for opening and closing said inner gates in unison through a portion of their full operating range without applying power to open said outer gates, and said closing means being effective to reclose said inner gates against a charge of material present in the hopper to discontinue the outward flow thereof.

10. A hopper as defined in claim 9 characterized in the provision of means carried by the associated ones of said inner and outer gates operable to permit partial opening of said inner gates independently of said outer gates and for thereafter engaging one another so that continued opening movement of said inner gates operates to open said outer gates in unison with said inner gates.

11. A hopper as defined in claim 10 characterized in that said means for opening and closing said gates comprises a pair of fluid operated reversible motors connected across the opposite ends of said inner pair of gates, and control means for reversing the direction of operation of said both of said motors in synchronism with one another.

12. A hopper as defined in claim 11 characterized in that said reversible motors comprise a pair of elongated cylinders extending crosswise of either end of said discharge opening with one end connected to one of said inner gates, and a piston slidable along the interior of each of said cylinders having means connecting the same to the other one of said inner gates.

13. In combination with a hopper having a wide area horizontally disposed discharge opening adapted to receive and to discharge wet soils and sticky viscous materials tending to stick to the hopper walls and to bridge across said discharge opening, said discharge opening being wider than the bridging capabilities of the materials to be handled by said hopper, an inner and an outer pair of U-shaped gates cooperating in the normal closed positions thereof to close said discharge opening, the legs of each pair of said gates projecting upwardly from the remote ends of the horizontal portions thereof, means connected to the upper ends of said legs pivotally supporting each pair of gates from said hopper for movement independently of the other pair of gates at points located closely above the horizontal plane of said discharge opening, means on said pairs of gates engageable as said inner pair of gates is moved at least to partially open position to initiate opening of said outer pair of gates, and means for pivoting both pairs of gates to a position laterally outwardly of either opposite side of said discharge opening and completely out of supporting engagement with the lading carried by the hopper.

14. The combination defined in claim 13 characterized in that the legs of each pair of said gates cooperate with one another and with the horizontal portions of said gates in the closed positions thereof to substantially augment the material storing capacity of said hopper.

15. The combination defined in claim 13 wherein said inner and outer pairs of gates are suspended from a pair of pivot axes disposed parallel to one another and positioned in vertical planes between the longitudinal center of said discharge opening and the opposite sides thereof.

16. The combination defined in claim 13 characterized in the provision of power means for operating said gates and supported directly on the legs of said inner pair of gates and operable to pivot said gates away from the closed position thereof, and means supported in part by said hopper and in part by each of said inner pair of gates for positively requiring the same to open and to close in unison with one another.

17. The combination defined in claim 13 characterized in that said power operating means comprises separate fluid motor means extending crosswise between and connected to the exterior sides of the legs of said inner pair of gates and operable in unison with one another to control the opening and closing movements of both pairs of said gates.

18. A mobile material transporting vehicle having a chassis provided with at least one pair of rear wheels, an elongated hopper adapted to handle lading supported lengthwise of said chassis having an outlet opening spaced closely above the roadway, said opening being substantially as wide as the spacing between the lateral side walls of said hopper whereby to dump lading from the hopper into a relatively wide-based low-height heap, a plurality of pairs of closure members normally closing said hopper outlet opening and pivoted to swing about axes parallel to the longitudinal axis of said hopper and positioned above the material supporting surfaces of said closure members when closed, the bottoms of one pair of said closure members, when closed, being positioned substantially below the level of the axles of said rear wheels and close to the roadway, and means including fluid-powered means connected with one pair of said closure members and effective to hold all of said members closed when actuated in one direction and effective to open said one pair of closure members outwardly and upwardly away from the roadway in advance of the opening of the second pair of closure members when actuated in the reverse direction.

19. A mobile material transporting vehicle as defined in claim 18 characterized in that said hopper outlet opening is sufficiently wide to dump the hopper lading in a wide-based heap the lateral edges of which lie in the path of the rear chassis wheels as the vehicle moves forward thereby elevating the rear end of the hopper.

20. A mobile material transporting vehicle as defined in claim 18 characterized in that a plurality of said closure members are disposed along each lateral side of said hopper outlet opening and include pivot supports in axial alignment with one another.

21. A bottom dumping hopper mounted on a wheeled chassis, said hopper having outer vertically disposed lateral walls extending along the opposite sides of said chassis, steeply inclined inner hopper walls having their upper edges merging with the upper edges of said outer walls, rectangular frame means forming a large area discharge opening for said hopper and having its inner edge corresponding in size and merging with the lower edge of said steeply inclined inner hopper walls, inner and outer pairs of gates suspended on pivot means mounted on the opposite ends of said discharge opening and swingable laterally crosswise of the longer lateral edges of said opening, said pairs of gates cooperating to close said opening and being swingable upwardly away from one another to an open position outwardly of said lateral edges, power means extending transversely of said hopper at a level above the plane of said discharge opening connected to said inner pair of gates, said power means including means for opening said inner pair of gates independently of said outer pair of gates to initiate hopper discharge and to withdraw said inner gates to a position underlying said outer gates and out of supporting contact with material in the hopper, and means for thereafter utilizing said power means to open said outer gates away from supporting contact with the material in said hopper.

22. A heavy-duty high-capacity mobile material transport apparatus comprising a trailer chassis supported at its forward end on a fifth wheel assembly mounted on the rear of a conventional truck, said trailer having a bottom dumping hopper mounted thereon having steeply inclined lateral side walls merging with the edges of a rectangular discharge opening, pairs of bracket means mounted on the opposite transverse end walls of said hopper with one of each pair mounted generally midway between the longitudinal center of said discharge opening and the adjacent lateral edge thereof, pivot pin means carried in each of said bracket means with their axes parallel to the longitudinal axis of said hopper, inner and outer pairs of gates suspended from said pivot pins and cooperating with one another when closed to substantially seal off discharge of material through said hopper discharge opening, said inner pair of gates being spaced close to the ground when closed, said outer gates having their material supporting surfaces diverging outwardly and upwardly from the outer lateral edges of said inner gates, and power operated means connected to said inner gates and operable selectively (a) to open said inner gates independently of said outer gates for discharging a narrow stream of material from said hopper and to deposit the same in a long narrow pile extending centrally lengthwise of said trailer and (b) for opening said inner gates to a position underlying said outer gates followed by simultaneous opening of said inner and outer gates in unison to deposit a wide pile of material occupying a base area substantially wider than the width of said trailer and the supporting wheels thereof whereby forward movement of said trailer following wide opening of said pairs of gates serves to advance the rear wheels of the trailer along the opposite lateral edges of the dumped material for elevating the rear end of the trailer to clear the discharged material.

23. Mobile material transport apparatus as defined in claim 22 characterized in that said power operated means interconnecting said inner pair of gates includes a double acting piston and cylinder assembly connected across the opposite ends of said inner pair of gates with the axis of the cylinders parallel to one another and extending crosswise of said trailer.

24. Mobile material transport apparatus as defined in claim 23 characterized in that the said piston and cylinder assemblies include means pivotally connecting the same to the remotely spaced outer edge areas of said inner gates.

25. Mobile material transport apparatus as defined in claim 23 characterized in that said gates are so constructed and arranged that the material supporting surfaces thereof are disposed generally vertically in their fully opened positions and spaced outwardly of the lateral edges of said hopper discharge opening, and said outer pair of gates being disposed outwardly of said inner pair of gates in said fully open positions.

References Cited in the file of this patent

UNITED STATES PATENTS

| | | |
|---|---|---|
| 758,135 | Harrison | Apr. 26, 1904 |
| 937,418 | Campbell | Oct. 19, 1909 |
| 938,976 | Clark | Nov. 2, 1909 |
| 1,122,273 | Hansen | Dec. 29, 1914 |
| 1,408,984 | Carlquist | Mar. 7, 1922 |
| 1,427,452 | Finckh | Aug. 29, 1922 |
| 1,465,375 | Stovall | Aug. 21, 1923 |
| 1,525,236 | Hayer | Feb. 3, 1925 |
| 2,268,290 | Laudis | Dec. 30, 1941 |
| 2,663,231 | Wood | Dec. 22, 1953 |
| 2,723,878 | Rockwell | May 15, 1955 |
| 2,836,332 | Standish et al. | May 27, 1958 |
| 2,836,431 | Shadwick et al. | May 27, 1958 |

FOREIGN PATENTS

| | | |
|---|---|---|
| 475,867 | Germany | May 3, 1929 |

UNITED STATES PATENT OFFICE
CERTIFICATE OF CORRECTION

Patent No. 3,145,057 August 18, 1964

Percy R. Taggart

It is hereby certified that error appears in the above numbered patent requiring correction and that the said Letters Patent should read as corrected below.

Column 7, lines 33 and 34, strike out "the lower adjacent ones of".

Signed and sealed this 6th day of April 1965.

;EAL)
ttest:

RNEST W. SWIDER
ttesting Officer

EDWARD J. BRENNER
Commissioner of Patents